United States Patent
Irie

(10) Patent No.: US 8,080,598 B2
(45) Date of Patent: Dec. 20, 2011

(54) ADDITION-REACTION-CURABLE SILICONE RUBBER COMPOSITION AND A MOLDED ARTICLE THEREFROM

(75) Inventor: Masakazu Irie, Chiba (JP)

(73) Assignee: Dow Corning Toray Company, Ltd., Chiyoda-ku, Tokyo (JP)

( * ) Notice: Subject to any disclaimer, the term of this patent is extended or adjusted under 35 U.S.C. 154(b) by 0 days.

(21) Appl. No.: 12/521,235

(22) PCT Filed: Dec. 20, 2007

(86) PCT No.: PCT/JP2007/075335
§ 371 (c)(1),
(2), (4) Date: Mar. 1, 2010

(87) PCT Pub. No.: WO2008/081952
PCT Pub. Date: Jul. 10, 2008

(65) Prior Publication Data
US 2010/0144933 A1    Jun. 10, 2010

(30) Foreign Application Priority Data
Dec. 27, 2006  (JP) .................. 2006-352469

(51) Int. Cl.
*C08K 5/3445* (2006.01)
*C08K 5/3492* (2006.01)
*C08K 5/43* (2006.01)
*C08L 83/04* (2006.01)

(52) U.S. Cl. ......... 524/100; 524/106; 524/169; 524/588

(58) Field of Classification Search .................. 524/100, 524/106, 169, 588
See application file for complete search history.

(56) References Cited

U.S. PATENT DOCUMENTS

| 4,894,400 A | * | 1/1990 | Haruna et al. .................. 524/91 |
| 5,153,244 A | | 10/1992 | Akitomo et al. |
| 5,936,054 A | | 8/1999 | Achenbach et al. |
| 2006/0040116 A1 | | 2/2006 | Ikeno |

FOREIGN PATENT DOCUMENTS

| EP | 0731131 A1 | 9/1996 |
| EP | 0822234 A1 | 2/1998 |
| JP | 3146560 A | 6/1991 |
| JP | 2006056986 A | 3/2006 |

OTHER PUBLICATIONS

English language abstract for EP0822234 extracted from espacenet.com database, dated Nov. 13, 2009, 15 pages.
English language abstract for JP 3-146560 extracted from espacenet.com database, dated Nov. 13, 2009, 5 pages.
English language abstract for JP 2006-056986 extracted from espacenet.com database, dated Nov. 13, 2009, 10 pages.
PCT International Search Report for PCT/JP2007/075335, dated Apr. 11, 2008, 2 pages.

* cited by examiner

*Primary Examiner* — Kriellion Sanders
(74) *Attorney, Agent, or Firm* — Howard & Howard Attorneys PLLC

(57) ABSTRACT

An addition-reaction-curable silicone rubber composition comprising: 0.001 to 5 mass % of a metal deactivator and 0.001 to 5 mass % of a curing-retarder selected from an alcohol derivative having carbon-carbon triple bonds, an enzyme compound, an alkenyl-containing low-molecular-weight organosiloxane compound, or an alkyne-containing silane; and a molded body produced by curing the aforementioned addition-reaction-curable silicone rubber composition. The addition-reaction-curable silicone rubber composition is capable of producing a molded silicone rubber body, which is obtained with low compression set without resorting to secondary thermal treatment.

6 Claims, No Drawings

ADDITION-REACTION-CURABLE SILICONE RUBBER COMPOSITION AND A MOLDED ARTICLE THEREFROM

RELATED APPLICATIONS

This application claims priority to and all the advantages of International Patent Application No. PCT/JP2007/075335, filed on Dec. 20, 2007, which claims priority to Japanese Patent Application No. JP2006-352469, filed on Dec. 27, 2006.

TECHNICAL FIELD

The present invention relates to an addition-reaction curable silicone rubber composition that is suitable for forming a molded article which has low compression set without secondary heat treatment after primary curing.

BACKGROUND ART

An addition-reaction curable silicone rubber composition that contains silicon-bonded hydrogen atoms and silicon-bonded alkenyl groups and is curable by a hydrosilylation reaction in the presence of a hydrosilylation catalyst is known in the art. The above composition can be easily handled and can be cured at a lower temperature and during a shorter time than a radical-reaction curable silicone rubber composition and therefore finds application for manufacturing parts used in office-automation equipment, automobiles, and in other fields of industry. However, when the parts formed from the aforementioned composition operate over long time under conditions of high compression stress, they develop high compression set. In order to reduce these deformations, the aforementioned parts have to be subjected to secondary heat treatment, and this creates significant obstacles for improvement of productivity.

Heretofore, several compositions that contain various organic compounds aimed at the solution of the above problem have been proposed. For example, it was proposed to use an organopolysiloxane rubber composition curable by an addition reaction and compounded with a phthalocyanine compound (see Japanese Unexamined Patent Application Publication (hereafter referred to as "Kokai") H3-146560 (equivalent to U.S. Pat. No. 5,153,244)). However, articles molded from an organopolysiloxane rubber composition curable by an addition reaction and compounded with a phthalocyanine compound have limited practical application because of coloration caused by the phthalocyanine.

Furthermore, Kokai 2006-56986 (equivalent to US2006-0040116A1) discloses a two-part liquid type curable silicone composition that contains a triazole-based compound or an amidazole-based compound and that is characterized by low compression set. However, triazole-type compounds, such as benzotriazole, are characterized either by extremely slow speed of curing of silicone rubber compositions of the type curable by addition reaction, or by an unpleasant odor emitted during thermal molding of the aforementioned composition.

DISCLOSURE OF INVENTION

It is an object of the present invention to provide an addition-reaction curable silicone rubber composition that is suitable for forming a molded article which has low compression set and does not need secondary heat treatment after primary curing.

The addition-reaction curable silicone rubber composition of the invention comprises 0.001 to 5 mass % of a metal deactivator and 0.001 to 5 mass % of a compound used as a curing-retarder and is selected from an acetylene-containing silane, a vinyl-containing low-molecular-weight organosiloxane compound, or an alcohol derivative having carbon-carbon triple bonds.

The aforementioned metal deactivator can be a compound selected from a diacyl-hydrazide-based compound, an aminotriazole-based compound, or an amino-containing triazine-based compound.

Since the addition-reaction curable silicone rubber composition of the invention contains a metal deactivator, it becomes suitable for forming articles molded from silicone rubber, which are not subject to coloration and have low compression set without need of secondary heat treatment after primary curing. Furthermore, provision of the metal deactivator eliminates delay in speed of curing.

BEST MODE FOR CARRYING OUT THE INVENTION

The addition-reaction curable silicone rubber composition of the invention contains a metal deactivator and a curing-retarder selected from an alcohol derivative having carbon-carbon triple bonds, vinyl-containing low-molecular-weight organosiloxane, and acetylene-containing silane.

The aforementioned metal deactivator is the most specific component of the composition of the present invention. It is an indispensable component needed for imparting low compression set to a molded article obtained by curing the addition-reaction-curable silicone rubber composition of the invention without need in secondary heat treatment.

The metal deactivator may comprise a conventional agent of this type such as a diacylhydrazide-based compound, an oxalic-acid based compound, an aminotriazole-based compound, and an amino-containing triazine-based compound. Such an agent can be obtained from Ciba Specialty Chemicals Co., Ltd. and ADEKA Co., Ltd. Among the above, it is preferable to use a diacylhydrazide-based compound, an aminotriazole-based compound, and an amino-containing triazine-based compound, especially the diacylhydrazide-based compound, which is readily available and is easily dispersible in the silicone rubber composition.

The diacylhydrazide-based compound is represented by the following general formula (1):

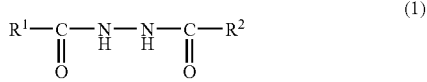

where $R^1$ and $R^2$ may be the same or different and may be represented by hydrogen atoms, hydroxyl groups, alkyl groups, substituted alkyl groups, aryl groups, phenol groups or similar substituted aryl groups, aralkyl groups, or substituted aralkyl groups. It is preferable that $R^1$ and $R^2$ comprise monovalent hydrocarbon groups that contain aryl groups, a phenol or a similar substituted aryl group.

More specific examples of the aforementioned diacylhydrazide-based compounds are the following: N,N'-diformyl hydrazine, N,N'-diacetyl hydrazine, N,N'-dipropionyl hydrazine, N,N'-butylyl hydrazine, N-formyl-N'-acetyl hydrazine, N,N'-dibenzoyl hydrazine, N,N'-ditolyoyl hydrazine, N,N'-disalicyloyl hydrazine, N-formyl-N'-disalicyloyl hydrazine, N-formyl-N'-butyl-substituted salicyloyl hydrazine, N-acetyl-N'-salicyloyl hydrazine, N,N'-bis[3-(3,5-di-t-butyl-4-hydroxyphenyl)propyonyl]hydrazine, oxalic acid-di-(N'-salicyloyl)hydrazine, adipic acid di-(N'-salicyloyl)hydrazine, or dodecane dioyl-di-(N'-salicyloyl)hydrazine. Commercially produce compounds of the aforementioned type are the following: Irganox MD1024 (trademark of Ciba Specialty Chemicals Co., Ltd.): N,N'-bis-[3-(3,5-di-t-butyl- 4-hydroxyphenyl)propionyl]hydrazine), or Adekastab CDA-6 (trademark of Adeka Co., Ltd.; dodcadioyl-di-(N'-salicyloyl)hydrazine).

The aminotriazole-based compound is expressed by the following general formula (2):

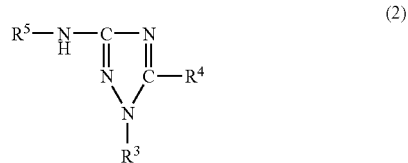

where $R^4$ and $R^5$ are the same or different and are represented by hydrogen atoms, alkyl groups, substituted alkyl groups, substituted aryl groups, carboxyl groups, acyl groups, alkyl-ester groups, aryl-ester groups, halogens, or alkali metals; $R^3$ may represent a hydrogen atom or an acyl group; $R^5$ may be an acyl group, preferably, a salicyloyl group, benzoyl group, or a similar acyl group having an aromatic ring.

Specific examples of the aforementioned compounds are the following: 3-amino-1,2,4-triazole, 3-amino-1,2,4-triazole-carboxylic acid, 3-amino-5-methyl-1,2,4-triazol, 3-amino-5-heptyl-1,2,4-triazol, etc.; or an acid amide derivative of an amino-triazole-based compound where the hydrogen atoms of a triazole-bonded amino groups are substituted with acyl groups, e.g., 3-(N-salicyloyl)amino-1,2,4-triazole or 3-(N-acetyl)amino-1,2,4-triazol-5-carboxylic acid. Most preferable among the above compounds is the acid amide derivative of the aminotriazole-based compound since this compound does not delay speed of curing of the addition-reaction-curable silicone rubber composition. An example of a commercially produced compound of this type is Adekastab CDA-1 (trademark of Adeka Co., Ltd.: 3-(N-salicyloyl) amino-1,2,4-triazole).

The amino-containing triazine-based compound can be exemplified by 2,4,6-triamino-1,3,5-triazine. An example of a commercially available compound of this type is Adekastab ZS-27 (trademark of Adeka Co., Ltd.: main component is 2,4,6-triamino-1,3,5-triazine).

The metal deactivator is added in an amount of 0.001 to 5 parts by mass per 100 parts by mass of component (A). If this agent is added in the amount of less than 0.001, the effect of decrease in compression set will be too low. If, on the other hand, this agent is added in an amount exceeding 5 parts by mass, this will be economically unjustifiable, and in some cases may lead to discoloration of the molded product.

The aforementioned curing-retarder is a component that is used for adjusting the relationship between speed of curing and storability to enable to use of the composition. Specific examples of the aforementioned compounds are the following: 3-methyl-1-butyn-3-ol, phenylbutynol, 1-ethynyl-1-cyclohexanol, or a similar alcohol derivative having carbon-carbon triple bonds; 3-methyl-3-penten-1-yne, 3,5-dimethyl-3-hexen-1-yne, or a similar enyne; tetramethyltetravinyl cyclotetrasiloxane, tetramethyltetrahexenyl cyclotetrasiloxane, or a similar alkenyl-containing siloxane of low molecular weight; 1-methyl-tris(3-methyl-1-butyn-3-oxy)silane, or vinyl-tris(3-methyl-1-butyn-3-oxy)silane, or a similar alkyne-containing silane.

The amount in which the curing-retarder is added to the composition of the invention is selected with reference to the method of molding and use of the addition-reaction-curable silicone rubber composition. In general, however, this agent should be used in the amount ranging from 0.001 to 5 mass %.

The addition-reaction-curable silicone rubber composition of the invention may comprise a conventional millable-type addition-reaction-curable silicone rubber composition, and preferably, a liquid-type addition-reaction-curable silicone rubber composition which normally comprises an organopolysiloxane (A) having in one molecule at least two alkenyl groups, an organohydrogenpolysiloxane (B) having in one molecule at least two silicon-bonded hydrogen atoms, a hydrosilylation-reaction catalyst (C), the aforementioned metal deactivator, and the aforementioned curing-retarder.

Organopolysiloxane (A), which is one of main components of the silicone rubber composition, has in one molecule at least two silicon-bonded alkenyl groups. The alkenyl groups can be represented by vinyl, allyl, propenyl, or similar groups. This component may contain organic groups other than alkenyl groups, such as methyl, ethyl, propyl, butyl, pentyl, hexyl, octyl, decyl, dodecyl, or similar alkyl groups; phenyl, tolyl, or similar aryl groups; β-phenylethyl, or similar aralkyl groups; or 3,3,3-trifluoropropyl, 3-chloropropyl, or similar halogenated alkyl groups. Component (A) may have a linear, partially branched linear, cyclic, or a net-like molecular structure. Component (A) may be combined with two or more different types of the aforementioned organopolysiloxanes. There are no special restrictions with regard to molecular weight of component (A), and this component may be used in various forms ranging from low-viscous liquids to highly viscous gum-like state organopolysiloxane. However, in order to obtain a cured composition in the form a rubber-like resilient body, it is recommended that the viscosity of component (A) be equal to or greater than 100 mPa·s at 25° C.

The organohydrogenpolysiloxane (B) is a cross-linking agent of the silicone rubber composition of the present invention. In the presence of hydrosilylation-reaction catalyst (C), this component promotes cross-linking and curing of the composition as a result of an addition reaction between the silicon-bonded alkenyl groups of component (A) and the silicon-bonded hydrogen atoms of component (B). The organohydrogenpolysiloxane of component (B) contains in one molecule at least two silicon-bonded hydrogen atoms. Organic groups other than the silicone-bonded hydrogen atoms may be represented by methyl, ethyl, propyl, or similar alkyl groups; phenyl, tolyl, or similar aryl groups; 3,3,3-trifluoropropyl, or 3-chloropropyl, or similar substituted alkyl groups. Component (B) may have a linear, partially branched, cyclic, or a net-like molecular structure. Organohydrogenpolysiloxanes of two or more different types can be used in combination.

There are no special restrictions with regard to the viscosity of component (B), and this component may have viscosity ranging from 3 to 10,000 centipoises at 25° C. In the composition of the present invention, component (B) can be used in an amount such that the ratio of the mole number of the silicon-bonded hydrogen atoms of the composition to the mole number of the silicon-bonded alkenyl groups is maintained in the range of (0.5:1) to (20:1), preferably (1:1) to (3:1). If the mole number of the silicon-bonded hydrogen atoms contained in the composition is less than 0.5 per 1 mole of the silicon-bonded alkenyl groups contained in the composition, then the latter can be insufficiently cured, and if, on the other hand, the mole number of the silicon-bonded hydrogen atoms exceeds 20 per 1 mole of the silicon-bonded alkenyl groups contained in the composition, this may cause formation of foaming in the cured body.

Hydrosilylation-reaction catalyst (C) is used as a catalyst for curing the addition-reaction type silicone rubber composition of the invention. The hydrosilylation-reaction catalyst of component (C) may be the same as conventional catalysts used for the same purpose and can be exemplified by chloroplatinic acid, an alcohol solution of chloroplatinic acid, an olefin complex of chloroplatinic acid, complexes with vinyl siloxanes or acetylene compounds, platinum black, platinum on a solid carrier, or other platinum-based catalysts; tetrakis-(triphenylphosphine) palladium, or similar palladium-based catalysts; or a chloro-tris (triphenylphosphine) rhodium-based catalyst. The catalyst of component (C) should be used in the amount of 0.1 to 500 parts by mass, preferably 1 to 50 pats by mass in terms of the catalytic metal per $10^6$ parts by mass of the total mass of components (A) and (B). If component (C) is used in the amount less than 0.1 parts by mass, curing will be insufficient, and if, on the other hand, it is used in the amount exceeding 500 parts by mass, this will become economically unjustifiable.

In order to adjust flowability of the composition and to improve mechanical strength of a molded body, the silicone rubber composition of the present invention can be combined with additives normally added to silicone rubber, such as, e.g., precipitated silica, fumed silica, baked silica, fumed titanium oxide, or a similar reinforcement filler; crushed quartz, crystalline silica, diatomaceous earth, asbestos, aluminosilicic acid, iron oxide, zinc oxide, calcium carbonate, or a similar non-reinforcement filler, or the aforementioned fillers surface treated with an organosilane, an organopolysiloxane, or a similar organosilicon compounds. The composition can be combined with acetylene black, furnace black, channel black, or a similar carbon black. If necessary, the composition may incorporate pigments, heat-resistant agents, flame retarders, mold-release agents, plasticizers, acid acceptors, non-functional silicone oils, or other similar additives normally used in conjunction with silicone rubber compositions.

The silicone rubber composition of the invention is easily prepared by uniformly mixing the aforementioned composition components, if necessary, together with appropriate additives. Mixing is carried out with the use of known mixing and kneading equipment such as a Ross mixer, two-roll mill, kneader-mixer, or the like.

The silicone rubber composition of the invention can be molded by conventional molding methods, such as, e.g., injection molding, extrusion, or compression molding.

EXAMPLES

The invention will be further described more specifically with reference to practical and comparative examples. It is understood that these examples should not be construed as limiting the scope of the invention. Characteristics of the silicone rubber compositions were measured according to the provisions of respective Japanese Industrial Standards (JIS) as described below. All values of viscosity were measured at 25° C.

<Curing Properties>
These properties were measured in accordance with JIS K 6300-2 that stipulates conditions for the flexural vibration-type flat-plate die vulcanization test. In this test, IP designates "induction period" and is represented by time (sec.) to the point at which increase of the torque is detected. T90 designates the time (sec.) which is required to reach 90% of the maximum torque which is assumed as the torque developed 3 minutes after initiation of the test. Instances where curing was impossible are designated by symbol NA (Not Applicable).

<Density>
This characteristic was measured in accordance with JIS K 6268.

<Hardness>
This characteristic was measured by a type-A durometer in accordance with JIS K 6253.

<Tensile Strength and Elongation at Rupture>
This characteristic was measured in accordance with JIS K 6251.

<Compression Set>
In accordance with JIS K 6262, compression set was measured after 22 hours of 25% compression at 180° C.

<Color>
Color of a molded product was evaluated by visual observation.

Preparation Example 1

A Ross mixer was loaded with the following components: 100 parts by mass of a dimethylpolysiloxane having a viscosity of 40,000 mPa·s and capped at both molecular terminals with dimethylvinylsiloxy groups; 40 parts by mass of fumed silica having BET specific area of 225 m$^2$/g; 7 parts by mass of hexamethyl disilazane; 2 parts by mass of water, and 0.2 parts by mass of a copolymer of a dimethylsiloxane and methylvinylsiloxane having viscosity of 20 mPa·s and capped at both molecular terminals with dimethylhydroxysiloxy groups (content of vinyl groups: about 10.9 mass %). The components were mixed and then heat treated for 2 hours at 200° C. under reduced pressure. As a result, a flowable silica master batch was prepared.

Practical Examples 1 to 6 and Comparative Examples 1 to 5

Ingredients shown in Tables 1 and 2 were mixed to uniform mixture conditions at 25° C. in a Ross mixer in the proportions indicated in the aforementioned tables. The obtained silicone rubber compositions were cured in a transfer press for 10 min. at 120° C., whereby specimens for testing compression set and rubber sheets for measuring various properties were produced. The obtained specimens and rubber sheets were used for measuring density, hardness, tensile strength, elongation, and compression set, as well as for visual evaluation of color. The results of measurements and observations are shown in Tables 1 and 2.

TABLE 1

|  | Practical Examples | | | | | |
|---|---|---|---|---|---|---|
|  | 1 | 2 | 3 | 4 | 5 | 6 |
| Silica master batch (parts by mass) | 100 | 100 | 100 | 100 | 100 | 100 |
| Organopolysiloxane (A) a-1 (parts by mass) | 20 | 20 | 20 | 20 | 20 | 20 |
| Organohydrogenpolysiloxane (B) b-1 (parts by mass) | 2.9 | 2.9 | 2.9 | 2.9 | 2.9 | 2.9 |

TABLE 1-continued

|  | Practical Examples | | | | | |
| --- | --- | --- | --- | --- | --- | --- |
|  | 1 | 2 | 3 | 4 | 5 | 6 |
| Platinum-based catalyst (C) (parts by mass) | 0.08 | 0.08 | 0.08 | 0.08 | 0.08 | 0.08 |
| (d) Metal deactivator | | | | | | |
| d-1 (parts by mass) | 0.2 | | | | | |
| d-2 (parts by mass) | | | | 0.1 | 0.03 | 0.01 |
| d-3 (parts by mass) | | 0.2 | | | | |
| d-4 (parts by mass) | | | 0.2 | | | |
| Curing-retarder (parts by mass) | 1 | 1 | 1 | 1 | 1 | 1 |
| Curing properties (3 min at 130° C.) | | | | | | |
| IP (sec) | 23 | 23 | 23 | 23 | 22 | 22 |
| T90 (sec) | 36 | 34 | 32 | 37 | 38 | 35 |
| Density (g/cm$^3$) | 1.12 | 1.12 | 1.12 | 1.12 | 1.12 | 1.12 |
| Hardness (JIS-A) | 49 | 50 | 51 | 49 | 49 | 51 |
| Tensile strength (MPa) | 7.9 | 8.7 | 8.3 | 8.5 | 8.9 | 9.3 |
| Elongation (%) | 350 | 400 | 360 | 420 | 450 | 450 |
| Compression Set (%) | 28.0 | 22.6 | 24.4 | 17.9 | 16.6 | 30.2 |
| Color | | | Semi-transparent | | | |

TABLE 2

|  | Comparative Examples | | | | |
| --- | --- | --- | --- | --- | --- |
|  | 1 | 2 | 3 | 4 | 5 |
| Silica master batch (parts by mass) | 100 | 100 | 100 | 100 | 100 |
| Organopolysiloxane (A) a-1 (parts by mass) | 20 | 20 | 20 | 20 | 20 |
| Organohydrogenpolysiloxane (B) b-1 (parts by mass) | 2.9 | 2.9 | 2.9 | 2.9 | 2.9 |
| Platinum-based catalyst (C) (parts by mass) | 0.08 | 0.08 | 0.08 | 0.08 | 0.08 |
| Phthalocyanine compound (parts by mass) | | 0.2 | | | |
| Benzotriazole solution (parts by mass) | | | 0.02 | 0.04 | 0.67 |
| Curing-retarder (parts by mass) | 1 | 1 | 1 | 1 | 1 |
| Curing properties (3 min at 130° C.) | | | | | |
| IP (sec) | 23 | 22 | 22 | 23 | NA |
| T90 (sec) | 38 | 33 | 44 | 61 | NA |
| Density (g/cm$^3$) | 1.12 | 1.12 | 1.12 | 1.12 | NA |
| Hardness (JIS-A) | 51 | 49 | 49 | 52 | NA |
| Tensile strength (MPa) | 10.5 | 9.1 | 10.2 | 10 | NA |
| Elongation (%) | 450 | 430 | 474 | 430 | NA |
| Compression Set (%) | 79.0 | 22.5 | 46.8 | 54.2 | NA |
| Color | Semi-transparent | Blue | Semitransparent | Semitransparent | NA |

Designations used in Tables 1 and 2 have the following meanings:

<Silica Master Batch>

This is the silica master batch prepared in Preparation Example 1: contains about 27 mass % of fumed silica <Component A: Organopolysiloxane> a-1: Copolymer of methylvinylsiloxane and dimethylsiloxane that has viscosity of 350 mPa·s and is capped at both molecular terminals with dimethylvinylsiloxy groups: content of vinyl groups of about 1.17 mass %

<Component B: Organohydrogenpolysiloxane> b-1: Copolymer of methylhydrogensiloxane and dimethylsiloxane, which is capped at both molecular terminals with trimethylsiloxy groups and has kinematic viscosity of 15 mm$^2$/sec; content of silicon-bonded hydrogen atoms of about 0.83 mass %

<Component C> Hydrosilylation-Reaction Catalyst>

1,3-divinyltetramethyldisiloxane solution of a platinum complex of 1,3-divinyltetramethyldisiloxane: 6,800 ppm content of metallic platinum <Metal Deactivator> d-1: Trademark—"Irganox" MD-1024:

N,N'-bis[3-(3,5-di-t-butyl-4-hydroxyphenyl)propionyl] hydrazine (the product of Ciba Specialty Chemicals Co., Ltd.)

d-2: trademark "Adekastab" CDA-1:

3-(N-salicyloyl)amino-1,2,4-triazole (the product of Adeka Co., Ltd.)

d-3: trademark "Adekastab" CDA-6:

dodecanedioyl-di-(N'-salicyloyl)hydrazine (the product of Adeka Co., Ltd.)

d-4: trademark "Adekastab" ZS-27:
a mixture the main component of which is 2,4,6-triamino-1,3,5-triazine (the product of Adeka Co., Ltd.)

<Phthalocyanine Compound>
Copper phthalocyanine: trademark "Rionol Blue FG-7330 (the product of Toyo Ink Co., Ltd.)

<Benzotriazole Solution>
Isopropyl alcohol (IPA) solution of benzotriazole with 30 mass % content of benzotriazole <Curing-Retarder>
A mixture of 2 parts by mass of ethynyl cyclohexanol and 98 parts by mass of a dimethylpolysiloxane that is capped at both molecular terminals with dimethylvinylsiloxy groups and has viscosity of 10,000 mPa·s.

INDUSTRIAL APPLICABILITY

Since, as has been shown above, the composition of the present invention possesses excellent moldability and after being molded produces a cured body that has low compression set, this composition is suitable for manufacturing parts capable of operating over a long time under conditions of compression stress, such as packings, rubber plugs, seal rings, or similar parts employed in automobiles, construction elements, parts of electric and electronic devices, etc. Furthermore, since the composition is suitable for molding parts that provide low compression set without use of secondary heat treatment, the composition is suitable for the manufacture of composite parts, e.g., co-molded parts produced from thermoplastics and silicone rubber compositions.

The invention claimed is:

1. An addition-reaction-curable silicone rubber composition comprising: 0.001 to 5 mass % of a metal deactivator and 0.001 to 5 mass % of a curing-retarder selected from an alcohol derivative having carbon-carbon triple bonds, an enyne compound, an alkenyl-containing low-molecular-weight organosiloxane compound, or an alkyne-containing silane, wherein the metal deactivator is
a diacylhydrazide-based compound represented by the following general formula (1):

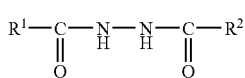

wherein $R^1$ and $R^2$ are each independently a hydrogen atom, a hydroxyl group, an alkyl group, a substituted alkyl group, an aryl group, a substituted aryl group, an aralkyl group, or a substituted aralkyl group;

an aminotriazole-based compound represented by the following general formula (2):

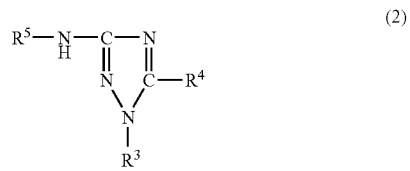

wherein $R^3$ is a hydrogen atom or an acyl group, $R^4$ is a hydrogen atom, an alkyl group, a substituted alkyl group, a substituted aryl group, a carboxyl group, an acyl group, an alkyl-ester group, an aryl-ester group, a halogen, or an alkali metal, and $R^5$ is an acyl group; or a 2,4,6-triamino-1,3,5-triazine.

2. The addition-reaction-curable silicone rubber composition of claim 1, wherein the metal deactivator is a diacylhydrazide-based compound.

3. The addition-reaction-curable silicone rubber composition of claim 1, comprising (A) an organopolysiloxane having in one molecule at least two alkenyl groups, (B) an organohydrogenpolysiloxane having in one molecule at least two silicon-bonded hydrogen atoms, (C) a hydrosilylation-reaction catalyst, the metal deactivator, and the curing-retarder.

4. A molded article obtained by curing the addition-reaction-curable silicone rubber composition according to claim 1.

5. A method to obtain a molded product characterized by curing the addition-reaction-curable silicone rubber composition according claim 1.

6. The addition-reaction-curable silicone rubber composition of claim 3, wherein the (A) organopolysiloxane has a viscosity equal to or greater than 100 mPa·s at 25° C.

* * * * *